(12) United States Patent
Yousef et al.

(10) Patent No.: US 7,491,417 B2
(45) Date of Patent: *Feb. 17, 2009

(54) PROCESS FOR OZONE-BASED DECONTAMINATION OF SHELL EGGS

(75) Inventors: Ahmed E. Yousef, Columbus, OH (US); Luis A. Rodriguez-Romo, Columbus, OH (US)

(73) Assignee: The Ohio State University Research Foundation, Columbus, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/862,206

(22) Filed: Jun. 7, 2004

(65) Prior Publication Data

US 2004/0224062 A1     Nov. 11, 2004

Related U.S. Application Data

(63) Continuation-in-part of application No. 09/954,923, filed on Sep. 18, 2001, now Pat. No. 6,800,315.

(51) Int. Cl.
*A23L 1/32* (2006.01)
*A23B 5/00* (2006.01)
*A23B 5/10* (2006.01)

(52) U.S. Cl. .................. 426/248; 426/298; 426/614; 426/312

(58) Field of Classification Search .......... 426/614, 426/298, 312, 248
See application file for complete search history.

(56) References Cited

U.S. PATENT DOCUMENTS

| | | | |
|---|---|---|---|
| 3,484,247 A * | 12/1969 | Harold et al. ............. 426/312 |
| 5,431,939 A | 7/1995 | Cox et al. |
| 5,549,477 A | 8/1996 | Tran et al. |
| 5,700,426 A | 12/1997 | Schmitthaeusler et al. |
| 5,932,265 A | 8/1999 | Morgan |
| 5,964,182 A | 10/1999 | Cox et al. |
| 5,983,830 A | 11/1999 | Cox |
| 6,004,603 A | 12/1999 | Vandepopuliere et al. |
| 6,391,259 B1 | 5/2002 | Malkin et al. |
| 6,433,293 B1 | 8/2002 | Bollinger et al. |
| 6,455,094 B1 | 9/2002 | Ball et al. |
| 6,800,315 B2 * | 10/2004 | Yousef et al. ............. 426/248 |

FOREIGN PATENT DOCUMENTS

| | | |
|---|---|---|
| HU | 206981 | 3/1990 |
| JP | 984482 | 3/1997 |
| JP | 11178515 | 7/1999 |
| WO | 03/024248 | 3/2003 |

OTHER PUBLICATIONS

American Egg Board, U.S. egg industry fact sheet, available at http://www.aeb.org/eii/facts/industry-facts-10-2003-htm, accessed Feb. 20, 2003, revised Oct. 2003.
Board et al., "The microbiology of eggs", pp. 81-104, In W.J. Stadelman et al., (ed.) Egg science and technology, The Hawthorn Press Inc., Binghamton, NY (1995).
Cox, et al, "Bactericidal treatment of hatching eggs IV. Hydrogen peroxide applied with vacuum and surfactant to eliminate Salmonella from hatching eggs", J. Appl Poult Res. 9, pp. 530-534 (2000).
Froix et al., A dynamic characterization via relaxation techniques of shell membranes of the domesticated fowl (Gallus/gallus (L.))., Polymer, 18, pp. 1213-1218 (1977).
Greer, et al., "Effects of ozone on beef carcass shrinkage, muscle quality and bacterial spoilage", Can Inst. Food Sci Technol J, 22, pp. 156-160 (1989).
Krivopishin, IP,"Permeability of the shell of chicken eggs for ozone", Sb. Rab. Molodykh Uch., Vses. Nauch.-Issled. Tekhnol. Inst. Ptitsevodstva, 12, pp. 88-91 (1970), Partial translation attached.
Labbe et al., "Limitations in the use of ozone to disinfect maple sap", J. Food Protection 64, pp. 104-107 (2001).
Padron, M, "Egg dipping in hydrogen peroxide solution to eliminate Salmonella Typhimurium from eggshell membranes", Avian Dis. 39, pp. 627-639 (1995).
Scott, VN, "Interaction of factors to control microbial spoilage of refrigerated foods", J Food Prot, 52: pp. 431-435 (1989).
Wangensteen, OD et al., "Diffusion of gases across the shell of the hen's egg", Respir. Physiol, 11: pp. 16-30 (1970/71).
Zeidler, G, "Processing and packaging shell eggs", pp. 1129-1161, In DD Bell et al., (ed), Commercial chicken meat and egg production, Kluwer Academic Publishers, Norwell, MA (2001).
International Search Report from PCT/US02/27555, mailed Dec. 12, 2002.

(Continued)

*Primary Examiner*—Anthony Weier
(74) *Attorney, Agent, or Firm*—Calfee, Halter & Griswold LLP

(57) ABSTRACT

Methods for reducing external and internal contamination of shell eggs by utilizing gaseous ozone applied under mild pressure, alone or in combination with UV radiation for external contaminants and gaseous ozone under mild pressure, a mix of carbon dioxide and ozone, heat, vacuum, or combinations thereof for internal contaminants.

21 Claims, No Drawings

OTHER PUBLICATIONS

Whistler et al., "Bacetericidal Activity, Eggshell Conductance, and Hatchability Effects of Ozone Versus Formaldehyde Disinfection", pp. 1074-1077, Poultry Science 68: 1989.

Braden, C.R. "Salmonella enterica Serotype Enteritidis and Eggs: A National Epidemic in the United States", Clinical Infectious Diseases, 43: 512-517, 2006.

Buckner, R. "U.S. Egg Safely Action Plan", Reproduced from Food Testing & Analysis, Apr./May 2000, 2 pgs.

James et al., "Surface pasteurisation of shell eggs", J of Food Engineering 53, pp. 193-197, 2002.

Frenzen et al., "Salmonella Cost Estimate Updated Using FoodNet Data", FoodReview, vol. 22, issue 2, pp. 10-15, May-Aug. 1999.

"Egg Safely Action Plan Update", Food Safely Initiative, Apr. 13, 2000, 2 page printout from http://www.cfsan.fda.gov/~dms/fsiupd06.html.

"FSA surveys non-UK produced eggs for salmonella", Food Standards Agency, Nov. 15, 2006, 2 page printout from http://www.food.gov.uk/news/pressreleases/2006/nov/surveyegg.

Hope et al., "An overview of the salmonella enteritidis risk assessment for shell eggs and egg products", Risk Analysis, vol. 22, No. 2, 2002, pp. 203-218.

Leistner et al., "Basic aspects of food preservation by hurdle technology", International J of Food Microbiology, 55, pp. 181-186, 2000.

Novak et al "Viability of clostridium perfringens, *escherichia coli*, and listeria monocytogenes surviving mild heat or aqueous ozone treatment on beef followed by heat, alkai, or salt stress", J of Food Protection. vol. 66, No. 3, pp. 382-389, 2003.

Schuman et al., "Immersion heat treatments for inactivation of salmonella enteritidis with intact eggs", J of Applied Microbiology, 83: pp. 438-444, 1997.

Ito et al., "Influence of the hatchability of Japanese quail eggs (hatching eggs) and sterilization effects for salmonella by ozone gas sterilization", Research Bulletin of the Aichi-ken Agricultural Research Center, 1999, Abstract only.

Tellez et al., "Effect of gamma irradiation on commercial eggs experimentally inoculated with salmonella enteritidis", Radiat Phys Chem, vol. 46, No. 4-6, pp. 789-792, 1995.

Voetsch et al., "FoodNet estimate of the burden of illness caused by nontyphoidal salmonella infections in the United States", Clinical Infectious Diseases, 38 (supp 3) S-127-34, 2004.

Hou et al., "Pasteurization of intact shell eggs", Food Microbiology, 13, pp. 93-101, 1996.

Rodriguez Romo, "Control of Salmonella enterica serovar enteritidis in shell eggs by ozone, ultraviolet radiation, and heat", Dissertation, The Ohio State Univ, 2004, 185 pgs.

Himathongkham et al., "Efficacy of disinfection of shell eggs externally contaminated with salmonella enteritisdis implications for egg testing", International J of Food Microbiology, 49, pp. 161-167, 1999.

Khadre et al., "Microbiological Aspects of Ozone Applications in Food: A review", J of Food Science, vol. 66, No. 9, 2001, pp. 1242-1252.

Kim et al., "Ozone and its current and future application in the food industry", Advances in Food and Nutrition Research, vol. 45, pp. 167-218, 2003.

Kim et al., "Application of Ozone for enhancing the microbiological safety and quality of Foods: A review", J of Food Protection, vol. 62, No. 9, 1999, pp. 1071-1087.

Mermelstein, "Pasteurization of Shell Eggs", Products & Technogies Processing, FoodTechnology, vol. 55, No. 12, 3 pgs., Dec. 2001.

Rodriguez-Romo et al., "Research note: Penetration of ozone gas across the shell of hen eggs", Ozone: Science and Engineering, 29: 147-150, Mar.-Apr. 2007.

Rodriguez-Romo et al., "Inactivation of salmonella enterica serovar enteritidis on shell eggs by ozone and UV radiation", J of Food Protection, vol. 68, No. 4, pp. 711-717, 2005.

Schuman et al., "Immersion heat treatments for inactivation of salmonella enteritidis with intact eggs", J of Applied Microbiology, 83: 438-444, 1997.

Humphrey et al., "A comparative study of the heat resistance of salmonellas in homogenized whole egg, egg yolk or albumen", Epidemiol Infect, 104, 237-241, printed Great Britain, 1990.

Mitsuda et al., "Synergistic effect of ozone and carbon dioxide gases for sterilizing food", Proc Japan Acad, vol. 66B, Ser. B, 1990, pp. 68-72.

Davies et al., "Investigations into possible alternative decontamination methods for salmonella enteritidis on the surface of table eggs", J Vet Med, B 50, pp. 38-41, 2003.

Koidis et al., "Efficacy of ozone treatment to eliminate salmonella entiritidis from eggshell surface", Archiv fur Lebensmittelhygien, 51: pp. 1-32, Jan./Feb. 2000.

Stadelman et al., "Pasteurization of Eggs in the Shell", Poultry Science, 75: pp. 1122-1125, 1996.

van Lith et al., "Pasteurization of table eggs to eliminate Salmonellae", Archiv fur Geflugelkunde, pp. 157-160, Feb. 1995.

Bailey et al., 1996, Poultry Sci, 75: pp. 191-196.

Achen et al., "Efficacy of Ozone Against *Escherichia coli* O157:H7 on Apples", J. Food Science, vol. 66, No. 9, 2001, pp. 1380-1384.

Barbour et al., "Preliminary attempts towards production of table eggs free from salmonella enteritidis", J Cleaner Production, 9, pp. 69-73, 2001.

Brackett et al., "Thermal inactivation kinetics of salmonella spp. within intact eggs heated using humidity-controlled air", J Food Protection, vol. 64, No. 7, pp. 934-938, 2001.

Chantarapanont, et al., "Factors influencing inactivation of salmonella enteritidis in hard-cooked eggs", J of Food Protection, vol. 63, No. 1, pp. 36-43, 2000.

Cogan et al., "Growth of salmonella enteritidis in artifically contaminated eggs: the effects of inoculum size and suspending media", International J of Food Microbiology, 70, pp. 131-141, 2001.

Whistler et al., "Biocidal activity of ozone versus formaldehyde against poultry pathogens inoculated in a prototype setter", Poultry Science, 68, pp. 1068-1073, 1989.

\* cited by examiner

PROCESS FOR OZONE-BASED DECONTAMINATION OF SHELL EGGS

CROSS-REFERENCE TO RELATED APPLICATIONS

This patent application is a continuation-in-part of application Ser. No. 09/954,923 filed on Sep. 18, 2001 now U.S. Pat. No. 6,800,315 and entitled: "Methods for Decontaminating Shell Eggs," the entire disclosure of which is incorporated by reference as if fully rewritten herein.

STATEMENT REGARDING FEDERALLY FUNDED RESEARCH

This invention was not made by an agency of the United States Government nor under contract with an agency of the United States Government.

TECHNICAL FIELD OF THE INVENTION

The present invention relates generally to the decontamination of avian shell eggs, and specifically to the reduction of microbial contaminants on both the exterior and interior of avian shell eggs through the application of gaseous ozone, carbon dioxide, heat, ultraviolet radiation, vacuum, pressure, and combinations thereof.

BACKGROUND OF THE INVENTION

Contamination of shell eggs with microorganisms such as *Salmonella enterica* subsp. *enterica serovar Enteritidis* (*Salmonella Enteritidis*) constitutes a health hazard to consumers, an added liability to the food industry, and an extra burden on governmental agencies involved in regulation and surveillance of the food industry. The fresh egg is one of the most common vehicles for the transmission of *Salmonella* spp. to humans. Salmonellosis, the food-transmitted disease caused by *Salmonella* spp., results from the consumption of contaminated shell eggs or products containing egg components. According to some estimates, only 1 in 20,000 raw eggs in the United States are contaminated with *Salmonella Enteritidis*; however, *Salmonella* transmission through contaminated eggs results in 700,000 cases of salmonellosis and costs approximately $1.1 billion annually.

The primary objectives of food sanitation include reducing the levels of microorganisms in food and preventing or limiting their proliferation in contaminated food items. Food sanitation typically involves applying one or more established decontamination procedures to various food items. Cleaning eggs by washing is a common practice, which is required in plants operating under the Federal Grading Service (USDA, 2004). Egg washers currently used in the food industry spray the eggs with water that contains commercially-available sanitizers and detergents. A variety of procedures have been developed to control or eliminate *Salmonella Enteritidis* in eggs; however, available methods are time consuming, uneconomical and may be only partially effective. Proposed alternative decontamination methods include the use of thermal treatments, gamma radiation, chlorine and iodine, hydrogen peroxide, ultraviolet (UV) radiation, pulsed light, gas plasma, electrolyzed oxidative water, and ozone.

Short-wave UV radiation is known to be effective against microorganisms that are airborne, on food surfaces, or in liquids. Treatment with UV radiation has been shown to effectively reduce the contamination of shell eggs by aerobic bacteria, yeasts and molds, and *Salmonella Typhimurium*. Additionally, heat treatment has been utilized to sanitize the egg surface and to eliminate internal *Salmonella Enteritidis*. Ozone ($O_3$) is known to be a strong and highly reactive antimicrobial agent. Ozone has been extensively studied for potential applications in the food industry for ensuring the safety of food products such as meat, poultry, fish, fruits and vegetables, cheese, and many other foods. Ozone has also been tested in decontaminating hatcheries, hatching eggs, poultry chill water, and poultry carcass. The literature indicates that both gaseous and aqueous ozone inactivate many poultry pathogens that potentially contaminate the surface of shell eggs, setters, and hatchers. Ozone has been reported to have a relative eggshell penetrability of 68.1% and has been shown to have a synergistic effect when used in combination with carbon dioxide. Advantageously, ozone spontaneously decomposes into non-toxic oxygen and the United States Food and Drug Administration (FDA) has recently approved the broad use of ozone in foods (CFR, 2001).

Despite the approaches discussed above, currently there are no low-temperature treatments capable of effectively sanitizing egg surface, nor methods to inactivate *Salmonella* inside shell eggs without impacting overall egg quality. Low temperatures are known to preserve the quality and safety of shell eggs during production, storage, transportation and retail. Maintaining the shell eggs at low temperatures may also significantly reduce the incidence of *Salmonella Enteritidis* egg-related illnesses. Thus, there is a need for more economic, effective treatments for inactivating *Salmonella* inside and on the surface of shell eggs without compromising the quality of the eggs being treated.

SUMMARY OF THE INVENTION

Disadvantages of the prior art are overcome by the present invention, which provides methods for decontaminating the outer egg surface and reducing internal contamination of shell eggs by utilizing gaseous ozone at low temperatures. Reduction of external *Salmonella Enteritidis* contamination at low temperatures is achieved using gaseous ozone applied under mild pressure alone, or in combination with UV radiation. In one embodiment, reduction of internal *Salmonella Enteritidis* contamination of shell eggs is achieved using a combination of heat, vacuum, and gaseous ozone under mild pressure. In another embodiment, reduction of internal *Salmonella Enteritidis* contamination of shell eggs is achieved using a combination of heat, vacuum, and a mix of carbon dioxide and gaseous ozone.

A first exemplary method for treating the exterior of contaminated, unfertilized shell eggs includes the steps of placing contaminated eggs (which are at or below ambient or room temperature) in a sealed vessel, wherein the internal pressure of the sealed vessel is equal to atmospheric pressure, increasing the pressure inside the vessel to greater than atmospheric pressure by introducing gaseous ozone (at, for example, a concentration of 2-14% wt/wt) into the sealed vessel, and maintaining the shell eggs in the sealed vessel for a brief period of time.

An alternate method for treating the exterior of a contaminated, unfertilized shell eggs includes the steps of exposing the shell eggs to UV radiation, transferring the contaminated shell eggs to a sealed vessel, wherein the internal pressure of the sealed vessel is equal to atmospheric pressure, increasing the pressure inside the vessel to greater than atmospheric pressure by introducing gaseous ozone (at, for example, a concentration of 2-14% wt/wt), and maintaining the shell eggs in the sealed vessel for a brief period of time.

A first exemplary method for treating the interior of contaminated, unfertilized shell eggs includes the steps of placing the shell eggs (which are at or below ambient temperature) in a sealed vessel, wherein the internal pressure of the sealed vessel is equal to atmospheric pressure, decreasing the pressure inside the vessel to less than atmospheric pressure, introducing gaseous carbon dioxide into the sealed vessel, introducing gaseous ozone into the sealed vessel (at, for example, a concentration of 2-14% wt/wt), and maintaining the shell eggs in the sealed vessel for a brief period of time.

An alternate method for treating the interior of contaminated, unfertilized shell eggs includes the steps of heating the shell eggs, transferring the heated shell eggs to a sealed container, wherein the internal pressure of the sealed container is equal to atmospheric pressure, decreasing the internal pressure of the sealed vessel to below atmospheric pressure, introducing gaseous ozone into the sealed vessel (at, for example, a concentration of 2-14% wt/wt), and maintaining the shell eggs in the sealed vessel for a brief period of time.

Another alternate method for treating the interior of contaminated, unfertilized shell eggs includes the steps of heating the shell eggs, transferring the heated shell eggs to a sealed container, wherein the internal pressure of the sealed container is equal to atmospheric pressure, decreasing the internal pressure of the sealed vessel to below atmospheric pressure, introducing gaseous carbon dioxide into the sealed vessel, introducing gaseous ozone into the sealed vessel (at, for example, a concentration of 2-14% wt/wt), and maintaining the shell eggs in the sealed vessel for a brief period of time.

Further advantages of the present invention will become apparent to those of ordinary skill in the art upon reading and understanding the following detailed description of the preferred embodiments.

DETAILED DESCRIPTION OF THE INVENTION

The present invention provides methods, which utilize ozone, to reduce bacterial contamination of unfertilized shell eggs by about 1 to $\geq 6.3$ log CFU/g, in a relatively short period of time (e.g., about 1 to 20 minutes) and at a relatively low (e.g., about 1 to 25° C.) or intermediate (e.g., about 25 to 60° C.) temperatures. Shell eggs treatable by these methods may include any of a variety of avian eggs covered by an intact hard exterior shell and having a substantially liquid core or center. Unfertilized eggs are eggs that have not been fertilized by sperm or that are not pre-fertilized or "vital" eggs.

Because gasses at certain pressures and equipment under vacuum are utilized with this invention, multiple pressure units are included herein. A gauge measurement of pressure in pounds per square inch (psig) is used for pressures at or above the atmospheric level when a vacuum is applied, "in Hg vac" units are used.

A. Treatment of External Contamination

A first exemplary embodiment of the present invention provides a method for reducing external contamination of shell eggs by utilizing ozone in combination with other treatments. Reduction of external *Salmonella Enteritidis* contamination at low temperatures is achieved using gaseous ozone applied under relatively mild pressure, alone or in combination with UV radiation. In the embodiments described below, the treated shell eggs are at or below ambient (i.e., room) temperature prior to treatment and the ozone used to treat the shell eggs is applied at concentrations greater than the concentration of ozone normally present in ambient air.

According to the present invention, an exemplary method for treating the exterior of contaminated, unfertilized shell eggs includes the steps of (i) placing the contaminated shell eggs (which are at or below ambient temperature) in a sealed vessel, wherein the internal pressure of the sealed vessel is equal to atmospheric pressure; and (ii) increasing the pressure inside the vessel to greater than atmospheric pressure by introducing gaseous ozone into the sealed vessel. The introduction of gaseous ozone increases the internal pressure of the sealed vessel to about 1 to 20 psig. Following the introduction of gaseous ozone, the internal temperature of the sealed vessel is maintained at about 1 to 50° C. and the shell eggs are typically treated in the vessel for at least one minute, preferably for about 10 to 20 minutes, and for up to about 90 minutes. Utilization of this method typically results in $\geq 5.9$ log CFU/g reduction of bacterial contamination on the exterior surface of the shell eggs.

In an alternate method, UV radiation and gaseous ozone are both utilized. This method for treating the exterior of contaminated, unfertilized shell eggs includes the steps of (i) exposing the shell eggs to UV radiation; (ii) transferring the contaminated shell eggs to a sealed vessel, wherein the internal pressure of the sealed vessel is equal to atmospheric pressure, and increasing the pressure inside the vessel to greater than atmospheric pressure by introducing gaseous ozone into the sealed vessel. Preferably, the wavelength of the UV radiation is 254 nm and the intensity of the UV radiation is 1500 to 2500 $\mu W/cm^2$. The introduction of gaseous ozone raises the internal pressure of the sealed vessel to about 5 to 15 psig. Following the introduction of gaseous ozone, the internal temperature of the sealed vessel is maintained at about 1 to 50° C. and the contaminated, unfertilized shell eggs are treated in the vessel for at least one minute, and preferably, about 2 to 3 minutes. Utilization of this method typically results in 1 to $\geq 4.7$ log CFU/g reduction of bacterial contamination on the surface of the shell eggs.

B. Treatment of Internal Contamination

In a second exemplary embodiment of the present invention, reduction of internal *Salmonella Enteritidis* contamination of shell eggs is achieved using gaseous ozone under mild pressure, a mix of carbon dioxide and gaseous ozone, heat, vacuum, or combinations thereof. In the methods described below, the ozone used to treat the shell eggs is applied at concentrations greater than the concentration of ozone normally present in ambient air.

According to this embodiment, an exemplary method for treating the interior of contaminated, unfertilized shell eggs includes the steps of (i) placing the shell eggs (which are at or below ambient temperature) in a sealed vessel, wherein the internal pressure of the sealed vessel is equal to atmospheric pressure; (ii) decreasing the pressure inside the vessel to less than atmospheric pressure; (iii) introducing gaseous carbon dioxide into the sealed vessel, and (iv) introducing gaseous ozone into the sealed vessel. Vacuum is applied to the interior of the sealed vessel, up to about 29.9 in Hg vac. The gaseous carbon dioxide is first introduced into the sealed vessel until a pressure of about 5 psig is achieved and the gaseous ozone is subsequently injected into the sealed vessel until a pressure of about 15 psig is achieved. The shell eggs remain in the sealed vessel for a period of at least one minute, and may be treated for up to 40 minutes following the introduction of the gaseous ozone into the sealed vessel.

In an alternate embodiment, a method for treating the interior of contaminated, unfertilized shell eggs includes the steps of (i) heating the shell eggs; (ii) transferring the heated shell eggs to a sealed container, wherein the internal pressure of the sealed container is equal to atmospheric pressure; (iii) decreasing the internal pressure of the sealed vessel to below atmospheric pressure; and (iv) introducing gaseous ozone into the sealed vessel. Preferably, the eggs are heated to a temperature of about 57 to 60° C. for a period of about 10 to 40 minutes. Prior to the introduction of the gaseous ozone, a vacuum (up to 29.9 in Hg vac) is applied to the interior of the sealed container. The gaseous ozone is then introduced into the sealed container until an internal pressure of 10 to 20 psig is obtained. The shell eggs are treated with gaseous ozone for at least one minute, and preferably for a period of about 40 minutes. Utilization of this method typically results in about 1 to $\geq 6.3$ log CFU/g reduction of bacterial contamination in the interior of the shell eggs.

In another embodiment of the present invention, a method for treating the interior of contaminated, unfertilized shell eggs includes the steps of (i) heating the shell eggs; (ii) transferring the heated shell eggs to a sealed container, wherein the internal pressure of the sealed container is equal to atmospheric pressure; (iii) decreasing the internal pressure of the sealed vessel to below atmospheric pressure; (iv) introducing gaseous carbon dioxide into the sealed vessel; (v) and introducing gaseous ozone into the sealed vessel. Preferably, the shell eggs are heated to a temperature of about 57 to 60° C. for a period of about 20 to 25 minutes. Prior to the introduction of the gaseous carbon dioxide and the gaseous ozone, a vacuum is applied to the interior of the sealed container (up to 29.9 in Hg vac). The gaseous carbon dioxide is first introduced into the sealed vessel until a pressure of about 5 psig is achieved. The gaseous ozone is subsequently injected into the sealed vessel until a pressure of about 20 psig is achieved. The shell eggs are treated with the gaseous carbon dioxide and the gaseous ozone for at least one minute, and preferably for a period of about 10 to 40 minutes. Utilization of this method typically results in 1 to 4.2 log CFU/g reduction of bacterial contamination in the interior of the shell eggs.

The following examples are illustrative of effectiveness of the methods of the present invention. While specific numerical values, ranges, and time periods are included, these should not be construed in a limiting sense.

EXAMPLE 1

Decontamination of Eggs Inoculated Externally with *Salmonella Enteritidis*

To demonstrate the effectiveness of the present invention in reducing external contamination, shell eggs were externally contaminated with *Salmonella Enteritidis* to contain ~$10^6$ CFU/g shell. The eggs were then treated with gaseous ozone for 1 to 20 minutes, at 4° C. to 25° C., and 0 to 15 psig. A combination method included exposure to UV radiation for 1 minute, followed by exposure to gaseous ozone (12 to 14% wt/wt) under pressure (5 psig) for 2 minutes. For purposes of comparison, contaminated eggs where exposed to UV radiation (100-2500 $\mu W/cm^2$) for 1 to 5 minutes, without subsequent ozone treatment. Eggs that were (i) non-contaminated and non-treated, (ii) contaminated and non-treated, and (iii) contaminated and treated with air were used as controls.

A. Cultures and Growth Conditions

*Salmonella Enteritidis* was obtained from the culture collection of the Department of Microbiology at the Ohio State University. Aliquots of the stock culture were transferred to brain heart infusion broth, and incubated at 37° C. for 24 hours. Grown cultures were subsequently transferred in duplicate to 150 ml of MacConkey broth (0.1% inoculum), and incubated at 37° C. for 24 hours in an orbital shaker (New Brunswick Scientific Co. Inc., Edison, N.J.) under mild agitation. *Salmonella Enteritidis* grown cultures (50 ml) were centrifuged in duplicate (Sorval RC-5B, Dupont Instruments, Bannorbuck, Ill.) at 3020×g for 10 min. Cell pellets were resuspended in 20 ml of sterile phosphate buffer (0.1 M, pH 7.0) at 22 to 25° C., and mixed in vortex mixer for approximately 10 seconds. Harvested cells were washed once with phosphate buffer, centrifuged again, and resuspended as previously described. This concentrated suspension was used to prepare 200 ml of working cell suspension in phosphate buffer as a diluent. The working suspension, poured into a 400 ml sterile beaker, had an $OD_{600}$~0.4 and the cell density was $2.7 \times 10^7$-$1.0 \times 10^8$ CFU/ml.

B. Ozone Generation

Gaseous ozone (12-14% wt/wt in oxygen mixture at 1.45 liters/min total gas mix output) may be produced in an electrochemical ozone generator (Lynntech, Inc., College Station, Tex.), or alternately by corona discharge means. Ozone gas was pumped into the treatment chamber until the desired pressure was achieved.

C. Egg Preparation

Unfertilized, unwashed, fresh shell eggs were kept refrigerated and used within three weeks of laying. Individual eggs were washed and scrubbed using tap water and a brush, and then submerged in ethanol (70% vol/vol) for 30 minutes to eliminate external contaminants. Sanitized eggs were held to dry at 22 to 25° C. for about 30 minutes and then dipped into a *Salmonella Enteritidis* cell suspension, which was prepared as indicated above. Contaminated eggs were held to dry at 22 to 25° C. for about 30 minutes. Non-contaminated eggs were treated similarly and used as negative controls.

D. Egg Treatment with Gaseous Ozone Only

Eggs, externally contaminated with *Salmonella Enteritidis* (~$10^6$ CFU/g eggshell), were placed in a cold gasket-sealed stainless-steel pressure vessel (4000 ml, 21.6 cm diam.; Alloy Products Corp., Waukesha, Wis.) and treated with gaseous ozone (12-14% wt/wt) at 0 to 15 psig. Compressed air applied under pressure was used as a control. Treatment temperature was 4 to 8° C. and treatment time was 3 to 20 minutes. Results are given in Tables 1 and 2.

F. Egg Treatment with Short-wave Ultraviolet Radiation Only

Externally contaminated shell eggs (~$10^6$ CFU/g eggshell), were placed under a shortwave UV radiation source (254 nm; 15 Watt, G15T8 General Electric, Co., Cleveland, Ohio) on a horizontal apparatus, which allowed the adjustment of the radiation intensity (100-2500 $\mu W/cm^2$) by increasing or decreasing the distance between the source and the target. UV-radiation intensity was detected with a UV radiometer probe (254 nm; Model UVX-25; Ultraviolet Products, Inc. San Gabriel, Calif.), and measured in a digital radiometer (UVX-Digital Radiometer; Ultraviolet Products, Inc.). Eggs, constantly rotated during the UV exposure, were treated at the desired UV-radiation intensity, and subsequently analyzed for enumeration of *Salmonella*. Contaminated eggs not exposed to UV radiation were used as controls. The UV intensity at 254 nm was in the range of 100 to 2500 $\mu W/cm^2$, the treatment time was within the range of 1 to 5 minutes, and the treatment temperature was in the range of 22 to 25° C. Results are given in Tables 3 and 4.

G. Treatments of Eggs with Combinations of Ozone and Ultraviolet Radiation

Eggs, externally contaminated with *Salmonella Enteritidis* (~$10^6$ CFU/g eggshell), were treated for short periods of time with UV radiation in combination with gaseous ozone under pressure. One combination treatment consisted of exposure of contaminated eggs to short-wave UV radiation (254 nm; 1500-2500 µW/cm² intensity; 22 to 25° C.) for 1 minute, followed by immediate application of gaseous ozone at 12-14% wt/wt and 4 to 8° C. under pressure (5 psig) for 1 minute. Results are shown in Table 5.

H. Enumeration of *Salmonella*

The average weight of an eggshell was determined by cracking the eggs and weighing the shells. In this series of experiments, the average weight was 9.0 g. Treated or control eggs were cracked aseptically, egg contents were discarded, and the shell of each egg was collected in a blender jar for homogenization. Peptone water (0.1%, 81 ml) was mixed with the shell in the blender for 1 minute at a medium speed. Aliquots (1 ml) of the serial decimal dilutions were plated on PCA and incubated at 37° C. for 24 hours for plate count. *Salmonellae* were confirmed by streaking selected colonies onto xylose lysine deoxycholate (XLD) agar, incubating at 37° C. for 24 hours, and observing the characteristic colonial morphology.

The data in Tables 1 through 5 were obtained from a duplicate series of experimental runs. Statistical calculations were processed in a MNITAB™ 13.3 version statistical software (Minitab, Inc. 2000). One-way analysis of variance (ANOVA) was performed to determine the differences among control and treatments al 95% confidence limits. Means were compared by Tukey with α=0.05.

TABLE 1

Inactivation of *Salmonella* Enteritidis when externally-contaminated shell eggs were treated with ozone

| Treatments[1] | Time (Minutes) | Log CFU/g eggshell[2] | Log reduction |
|---|---|---|---|
| Control | 0 | 6.3 ± 0.2A[3] | n/a[4] |
| Gaseous Ozone | 3 | 3.2 ± 0.3B | 3.1 |
| | 5 | 4.0 ± 0.1C | 2.3 |
| | 8 | 3.7 ± 0.1C | 2.6 |

[1]Control: contaminated shell eggs without treatments; Gaseous ozone: 12-14% wt/wt, 4-8° C.
[2]Data presented as Mean ± S.D.
[3]Means within columns not followed by the same letter are significantly different (P < 0.05).
[4]not applicable

TABLE 2

Inactivation of *Salmonella* Enteritidis when externally-contaminated shell eggs were treated with pressurized ozone

| Treatments[1] | Time (min) | Log CFU/g eggshell[2] | Log reduction |
|---|---|---|---|
| Control | 0 | 6.4 ± 0.14A | n/a[3] |
| Gaseous ozone | 10 | 0.5 ± 0.70 est.[4]B | ≧5.9 |
| | 20 | 0.7 ± 0.70 est.B | ≧5.7 |

[1]Control: contaminated shell eggs without treatments; Gaseous ozone: 12-14% wt/wt, 4-8° C., 15 psig.
[2]Data presented as Mean ± S.D; means within columns not followed by the same letter are significantly different (P < 0.05).
[3]not applicable.
[4]Estimated *Salmonella* Enteritidis number obtained using plate count agar with a detection limit of 10 cells/g eggshell

TABLE 3

Inactivation of *Salmonella* Enteritidis when externally-contaminated shell eggs were treated with ultraviolet radiation

| Treatments[1] | Time (min) | Log CFU/g eggshell[2] | Log reduction |
|---|---|---|---|
| Control | 0 | 5.8 ± 0.1A[3] | n/a[4] |
| UV | 2 | 3.2 ± 0.1B | 2.6 |
| | 4 | 3.8 ± 0.1B | 2.0 |

[1]Control: contaminated shell eggs without treatments; UV: ultraviolet radiation (254 nm; 100 µW/cm² intensity; 22-25° C.).
[2]Data presented as Mean ± S.D.
[3]Means within columns not followed by the same letter are significantly different (P < 0.05).
[4]not applicable

TABLE 4

Inactivation of *Salmonella* Enteritidis when externally-contaminated shell eggs were treated with high-intensity ultraviolet radiation

| Treatments[1] | Time (min) | Log CFU/g eggshell[2] | Log reduction |
|---|---|---|---|
| Control | 0 | 6.3 ± 0.17A[3] | n/a[4] |
| UV | 1 | 2.9 ± 0.27B | 3.4 |
| | 3 | 3.0 ± 0.89B | 3.3 |
| | 5 | 2.0 ± 0.78B | 4.3 |

[1]Control: contaminated shell eggs without treatments; UV: ultraviolet radiation (254 nm; 1500-2500 µW/cm² intensity; 22-25° C.).
[2]Data presented as Mean ± S.D.
[3]Means within columns not followed by the same letter are significantly different (P < 0.05).
[4]not applicable.

TABLE 5

Inactivation of *Salmonella* Enteritidis when externally-contaminated shell eggs were treated with a combination of ultraviolet radiation and ozone

| Treatments[1] | Time (min) | Log CFU/g eggshell[2] | Log reduction |
|---|---|---|---|
| Control | 0 | 6.0 ± 0.13A | n/a[3] |
| UV | 1 | 3.4 ± 0.53B | 2.6 |
| Gaseous ozone | 1 | 5.4 ± 0.14A | 0.6 |
| UV/O₃ | 2 | 1.3 ± 0.62 est.[4]C | ≧4.7 |

[1]Control: contaminated shell eggs without treatments; UV: ultraviolet radiation (254 nm; 1500-2500 µW/cm² intensity; 22-25° C.); Gaseous ozone: 12-14% wt/wt; 4-8° C., 5 psig; UV/O₃: UV for 1 min. followed by gaseous ozone under pressure for 1 min.
[2]Data presented as Mean ± S.D; means within columns not followed by the same letter are significantly different (P < 0.05).
[3]not applicable
[4]Estimated *Salmonella* Enteritidis number obtained in plate count agar with a detection limit of 10 cells/g eggshell The results indicated that ozone treatment alone or in combination with UV decreased significantly (P<0.05) the count of *Salmonella* Enteritidis on shell eggs. For example, treating contaminated eggs with gaseous ozone for 10 minutes at 4 to 8° C. and 15 psig decreased *Salmonella* population ≧5.7 log CFU/g. The combination of UV followed by gaseous ozone under pressure reduced the contamination by $\geq 4.7$ log CFU/g.

EXAMPLE 2

Decontamination of Eggs Inoculated with Salmonella Enteritidis in the Yolk

Internally contaminated shell-eggs were prepared by inoculating *Salmonella Enteritidis* in the center or the periphery of the yolk to contain $10^6$ to $10^7$ CFU/g. Eggs were treated with gaseous ozone under pressure (15 psig) for 10 minutes or by a carbon dioxide-gaseous ozone ($CO_2$—$O_3$) mixture under pressure (15 psig) for 10 to 15 minutes. In a first combination treatment, eggs were heated in a water bath at 60° C. for 15-20 minutes and then treated with gaseous ozone under pressure for 10 minutes. A second combination treatment consisted of heating eggs (58° C. for 20 minutes) followed by the application of a mixture of $CO_2$—$O_3$ under pressure for 10 to 15 minutes. Eggs that were (i) non-contaminated and non-treated, and (ii) contaminated and non-treated were used as controls. A more detailed description of the materials and methods for this set of experiments appears below.

A. Cultures and Growth Conditions

*Salmonella Enteritidis*, egg isolate, provided by the Ohio Department of Agriculture was used in the experiments. The bacterium was maintained in brain heart infusion broth. Aliquots of the stock cultures were transferred to 150 ml Mac-Conkey broth (0.1% inoculum) and incubated at 37° C. for 24 hours in an orbital shaker (G-24, New Brunswick Scientific) with agitation. *Salmonella Enteritidis* cells were separated in a refrigerated centrifuge (Sorval RC-5B, Dupont Instruments) at 3020×g for 10 minutes. The pellet was resuspended in 3 ml of sterile phosphate buffer (0.1 M, pH 7) to a final cell concentration of $10^9$ to $10^{10}$ CFU/ml.

B. Ozone Generation

Gaseous ozone (12-14% wt/wt in oxygen mixture at 1.45 liters/min total gas mix output) may be produced in an electrochemical ozone generator (Lynntech, Inc., College Station, Tex.), or alternately by corona discharge means. (Lynntech, Inc., College Station, Tex.). Ozone gas was released in the treatment chamber until the desired pressure was achieved.

C. Egg Preparation

Unfertilized, unwashed, fresh eggs were obtained from the Poultry Farm of The Ohio State University. Eggs were refrigerated and used within 3 weeks of laying. Individual eggs were washed and scrubbed using tap water and a brush, and then submerged in ethanol (70% vol/vol) for 30 minutes to eliminate external contaminants. Sanitized eggs were kept at 22 to 25° C. for about 30 minutes to dry. Aliquots of 10-50 µl of *Salmonella Enteritidis* cell suspension ($10^9$ to $10^{10}$ CFU/ml) were inoculated, in the center of the yolk of individual eggs, using a chromatography syringe. The inoculum was placed inside the egg yolk through a drilled hole previously made on the site opposite to the air sac on the shell using a sterile needle (BD-22, 3.81 cm) coupled to a 1 ml tuberculin syringe. The inoculation site was sealed with a droplet of Duro™ Super Glue®. Alternatively, *Salmonella Enteritidis* inoculum was placed in the periphery of the yolk by inoculating, at a predetermined depth, in the equatorial region of individual eggs. The equatorial inoculation site was sealed as previously described. Non-contaminated eggs were sanitized and used as negative controls.

D. Applying Ozone and Carbon Dioxide-ozone Mixture

Eggs contaminated with *Salmonella Enteritidis* (~$10^6$ CFU/g), were placed in a gasket-sealed stainless-steel pressure vessel (4000 ml, 21.6 cm diam.; Alloy Products Corp., Waukhesa, Wis.). The vessel was pressurized with gaseous ozone (12 to 14% wt/wt) to reach 15 psig and the pressurized ozone was maintained for 10 minutes. Results are given in Tables 6 and 7. Before treating the eggs with the mixture of carbon dioxide and gaseous ozone, vacuum (5-10 in Hg vac) was generated in the treatment chamber by a pump. The gas mixture was formed by releasing carbon dioxide into the vessel until a pressure of 5 psig was reached, and subsequently injecting gaseous ozone to achieve a pressure of 15 psig. The pressurized gas mixture was maintained during the time treatment of 10-15 minutes (Tables 8 and 9).

E. Treatment by Combination of Heat, Ozone and Carbon Dioxide

Eggs contaminated with *Salmonella Enteritidis* (~$10^6$ CFU/g) were heated at 58 to 60° C. by immersion in a water bath (Precision® circulating bath 260, Precision Scientific Inc. Ill.) for 15 to 20 minutes. The first combination treatment of the shell eggs consisted of the use of heat (60° C.) as previously described, followed by immediate application of gaseous ozone under pressure (15 psig) for 10 minutes, for a total treatment time of 25 to 30 minutes (Tables 6 and 7). In a second combination treatment, contaminated eggs were exposed to heat at 58° C. for 20 minutes, vacuum (5-10 in Hg vac), and $CO_2$—$O_3$ mixture (introduced as described previously) and treatment with gases for 10-15 minutes; total treatment time was 30 to 35 minutes. Results of the second combination are given in Tables 8 and 9. A similar experiment was done except that *Salmonella Enteritidis* was inoculated at the periphery of egg's yolk. Results are given in Table 10.

F. Enumeration of *Salmonella*

Ten eggs were cracked and their contents were weighed to determine the average weight. The average weight of the contents of the eggs used in these experiments was 50 grams. Treated or control eggs were cracked aseptically, shells were discarded, and the contents of each egg were collected in a stomacher bag for homogenization. Peptone water (0.1%, 450 ml) was mixed with the egg contents in a stomacher (Stomacher lab-blender 400, Cooke Laboratory Products, VA.) for 1 minute. Aliquots (0.1 ml) of the serial decimal dilutions were dispensed onto pre-poured plate count agar (PCA) and spread by glass beads. Plates were incubated at 37° C. for 48 hours for plate count. Salmonellae were confirmed by streaking selected colonies onto xylose lysine deoxycholate (XLD) agar, and incubating at 37° C. for 24 hours to observe the characteristic colonial morphology.

TABLE 6

Inactivation of *Salmonella* Enteritidis when internally-contaminated shell eggs (yolk-center inoculation) were treated with a combination of heat (60° C. for 15 minutes) and gaseous ozone.

| Treatments[1] | Time (min) | Log CFU/g egg contents[2] | Log reduction |
|---|---|---|---|
| Control | 0 | 6.8 ± 0.14A[3] | n/a[4] |
| Gaseous ozone | 10 | 6.6 ± 0.10A | 0.2 |
| Heat | 15 | 6.7 ± 0.09A | 0.1 |
| Heat/$O_3$ | 25 | 5.0 ± 0.23B | 1.8 |

TABLE 6-continued

Inactivation of *Salmonella* Enteritidis when internally-contaminated shell eggs (yolk-center inoculation) were treated with a combination of heat (60° C. for 15 minutes) and gaseous ozone.

| Treatments[1] | Time (min) | Log CFU/g egg contents[2] | Log reduction |
|---|---|---|---|

[1]Control: internally contaminated shell eggs without treatments; Gaseous ozone: 12–14% wt/wt, 15 psig; Heat: applied in a water bath at 60° C./15 min; Heat/$O_3$: heat at 60° C. for 15 minutes followed by gaseous ozone under pressure for 10 minutes.
[2]Data presented as Mean ± S.D.
[3]Means within columns not followed by the same letter differ significantly (P < 0.05).
[4]not applicable.

TABLE 7

Inactivation of *Salmonella* Enteritidis when internally-contaminated shell eggs (yolk-center inoculation) were treated with a combination of heat (60° C. for 20 minutes) and gaseous ozone.

| Treatments[1] | Time (min) | Log CFU/g Egg contents[2] | Log reduction |
|---|---|---|---|
| Control | 0 | 6.8 ± 0.14A[3] | n/a[4] |
| Gaseous ozone | 10 | 6.7 ± 0.10A | 0.1 |
| Heat | 20 | 4.6 ± 0.63B | 2.2 |
| Heat/$O_3$ | 30 | 3.2 ± 0.41C | 3.6 |

[1]Control: internally contaminated shell eggs without treatments; Gaseous ozone: 12–14% wt/wt, 15 psig; Heat: applied in a water bath at 60° C./20 min; Heat/$O_3$: heat at 60° C. for 20 minutes followed by gaseous ozone under pressure for 10 minutes.
[2]Data presented as Mean ± S.D.
[3]Means within columns not followed by the same letter differ significantly (P < 0.05).
[4]not applicable.

TABLE 8

Inactivation of *Salmonella* Enteritidis when internally-contaminated shell eggs (yolk-center inoculation) were treated with heat (58° C. for 20 minutes) and vacuum, and exposed to carbon dioxide and ozone for 10 minutes.

| Treatments[1] | Time (min) | Log CFU/g egg contents[2] | Log reduction |
|---|---|---|---|
| Control | 0 | 6.5 ± 0.09A[3] | n/a[4] |
| $CO_2/O_3$ | 10 | 6.7 ± 0.12A | 0.0 |
| Heat | 20 | 5.3 ± 0.34B | 1.2 |
| Heat/$CO_2/O_3$ | 30 | 3.7 ± 0.31C | 2.8 |

[1]Control: internally contaminated shell eggs without treatments; $CO_2/O_3$: vacuum (5-10 in Hg vac), carbon dioxide injection (up to 5 psig), and ozone application (12-14% wt/wt; up to 15 psig); Heat: applied in a water bath at 58° C./20 min; Heat/$CO_2/O_3$: heat at 58° C. for 20 minutes, followed by application of carbon dioxide-ozone gaseous mixture (as indicated earlier) for 10 minutes.
[2]Data presented as Mean ± S.D.
[3]Means within columns not followed by the same letter are significantly different (P < 0.05).
[4]not applicable.

TABLE 9

Inactivation of *Salmonella* Enteritidis when internally-contaminated shell eggs (yolk-center inoculation) were treated with heat (58° C. for 20 minutes) and vacuum, and exposed to carbon dioxide and ozone for 15 minutes.

| Treatments[1] | Time (min) | Log CFU/g egg contents[2] | Log reduction |
|---|---|---|---|
| Control | 0 | 6.5 ± 0.09A[3] | n/a[4] |
| $CO_2/O_3$ | 15 | 6.5 ± 0.22A | 0.0 |
| Heat | 20 | 5.3 ± 0.34B | 1.2 |
| Heat/$CO_2/O_3$ | 35 | 2.8 ± 0.76C | 3.7 |

[1]Control: internally contaminated shell eggs without treatments; $CO_2/O_3$: vacuum (5-10 in Hg vac), carbon dioxide injection (up to 5 psig), and ozone application (12-14% wt/wt; up to 15 psig); Heat: applied in a water bath at 58° C./20 minutes; Heat/$CO_2/O_3$: heat at 58° C. for 20 minutes, followed by application of carbon dioxide-ozone gaseous mixture (as indicated earlier) for 15 minutes.
[2]Data presented as Mean ± S.D.
[3]Means within columns not followed by the same letter differ significantly (P < 0.05).
[4]not applicable.

TABLE 10

Inactivation of *Salmonella* Enteritidis when internally-contaminated shell eggs (yolk-periphery inoculation) were treated with heat (58° C. for 20 minutes), vacuum, carbon dioxide and ozone.

| Treatments[1] | Time (min) | Log CFU/g egg contents[2] | Log reduction |
|---|---|---|---|
| Control | 0 | 7.9 ± 0.28A[3] | n/a[4] |
| $CO_2/O_3$ | 15 | 7.7 ± 0.37A | 0.2 |
| Heat | 20 | 4.5 ± 0.60B | 3.4 |
| Heat/$CO_2/O_3$ | 35 | 3.7 ± 0.17C | 4.2 |

[1]Control: internally contaminated shell-eggs without treatments; $CO_2/O_3$: vacuum (5-10 in Hg vac), carbon dioxide injection (up to 5 psig), and ozone application (12-14% wt/wt; up to 15 psig); Heat: applied in a water bath at 58° C./20 min; Heat/$CO_2/O_3$: heat at 58° C. for 20 min, followed by application of carbon dioxide-ozone gaseous mixture (as indicated earlier) for 15 minutes.
[2]Data presented as Mean ± S.D.
[3]Means within columns not followed by the same letter are significantly different (P < 0.05).
[4]not applicable.

The results indicate that combination treatments involving heat (60° C.) and gaseous ozone under pressure reduced internal *Salmonella* Enteritidis contamination by 1.8-3.6 log with a total treatment time of 25-30 minutes. Heat treatment of shell eggs at 58° C., followed by the application of the mixture $CO_2$—$O_3$ under pressure, reduced the contamination by 2.8 to 4.2 log in a 30 to 35 minutes total treatment time.

EXAMPLE 3

Treatment of Eggs Contaminted with *Salmonella Enteritidis* on the Yolk

A. Egg Preparation

Unfertilized, unwashed, fresh shell eggs (63±2 g/egg), were obtained from a local egg producer (Columbus, Ohio), and refrigerated at 4° C. Selected refrigerated eggs with 44-45 mm breadth diameter were held at ambient temperature (22 to 25° C.) for approximately 2 h. Shell eggs were washed with tap water, scrubbed with a plastic brush, and then submerged in ethanol (70% vol/vol) for 30 min to eliminate external contaminants. Sanitized eggs were placed on sterile carton trays and permitted to dry at ambient temperature (22 to 25° C.) for approximately 40 minutes before inoculation.

B. Cultures and Growth Conditions

*Salmonella Enteritidis*, egg isolate, was provided by the Ohio Department of Agriculture (Reynoldsburg, Ohio). One loopful of stock culture, maintained in brain heart infusion broth, was transferred in duplicate to 10 ml of fresh BHI medium and incubated at 37° C. for 24 hours. Grown cultures were subsequently transferred to 150 ml fresh MacConkey broth (0.1% inoculum)(Difco, Detroit, Mich.), and incubated at 37° C. for 24 hours in an orbital shaker (Model G-24, New Brunswick Scientific Co. Inc., Edison, N.J.) with mild agitation. Aliquots of 80 ml *Salmonella Enteritidis* culture were separated in a refrigerated centrifuge (Sorval RC-5B, Dupont Instruments, Bannorbuck, Ill.) at 3050×g for 10 minutes The supernatant was discarded; harvested cells were resuspended in 2.5 ml sterile chilled phosphate buffer (0.1 M, pH 7) to a final cell suspension of $10^9$ to $10^{10}$ CFU/ml.

C. Inoculation Protocol

Shells of sanitized eggs were carefully perforated in the approximate center of the egg breadth side with a 2.54-cm/22-gauge sterile needle coupled to a disposable syringe (1 ml Tuberculin syringe, Becton Dickinson & Co., Franklin Lakes, N.J.). *Salmonella Enteritidis* cell suspension (10 µl) was inoculated in the area surrounding the vitelline membrane outside the yolk of individual eggs. Inoculation was performed with a sterile 50-µl high-precision chromatography syringe (Model 705; 22S needle gauge, Hamilton Co., Reno, Nev.) with a fixed needle attached to a rubber stopper located 5-6 mm from the needle tip. Eggshell perforations were sealed immediately after inoculation with a droplet of commercial glue (Instant Krazy Glue®, Elmer's Products Inc., Columbus, Ohio) and allowed to dry for approximately 5 minutes. Sealed perforations were also covered with approximately 1 $cm^2$ of polytetrafluoroethylene (PTFE) films with silicone adhesive backing (Cole-Parmer Instrument Co., Vernon, Ill.). Internal *Salmonella Enteritidis* concentration was $10^6$ to $10^7$ CFU/g egg. Contaminated eggs were kept at ambient temperature (22 to 25° C.) for approximately 15 minutes before treatments. Previous experiments using the inoculation procedure with dyes demonstrated the consistency of inoculum placement (data not shown).

D. Experimental Design

The experimental design for elimination of *Salmonella Enteritidis* inside shell eggs by heat and ozone was generated in JMP IN® (version 4; SAS Institute Inc., Cary, N.C.) software using a response surface method with randomized two-center points central composite design. Twenty-five experimental conditions were obtained from the software. The experimental design included heat treatments of shell eggs at 57 to 59° C. for 20 to 40 minutes. Proposed gaseous ozone treatment conditions were at 10 to 20 psig pressure range for 20 to 40 minutes. Carbon dioxide treatment conditions proposed were at 5 to 10 psig pressure range. Vacuum (5-10 in Hg vac) was applied prior to the use of ozone or ozone-carbon dioxide mixtures. One hundred and twelve shell eggs treated by individual or combined factors were used to develop the surface model. Experiments were performed in duplicate with a total of four shell eggs per experimental condition and appropriate controls.

E. Ozone Generation

Gaseous ozone ($O_3$) was produced in an electrochemical ozone generator (12-14% wt/wt ozone in oxygen mixture, 1.45 liters/min flow rate; LT 1 Model, Lynntech, Inc., College Station, Tex.) set at 90-95% capacity according to manufacturers instructions. Excess gaseous ozone was destroyed in a heated catalyst (Lynntech, Inc.).

F. Heat Treatment

Shell eggs inoculated with *Salmonella*, as previously described, were placed in a stainless steel wire basket (15× 15×15 cm), and heat treated by immersion in a calibrated water bath with a circulating pump (Model 260, Precision®, Precision Scientific, Inc., Chicago, Ill.) containing distilled deionized water at 57, 58 or 59° C. for 20 to 40 minutes according to experimental design. Temperature variations during heat treatments in the water bath were ±0.2° C.; water level above shell eggs was ~6 cm. Two eggs per experimental condition in duplicate series were taken from the water bath and immediately transferred to the airtight vessel for ozone treatments as described below. In the case of heat treated only shell eggs, sets of four eggs per experimental condition were taken from the water bath after treatments, and permitted to cool in 2-liter beakers containing 1.5 liters of sterile distilled deionized water at ambient temperature (22° C.) for 10 minutes. Cooled shell eggs were gently dry wiped with paper tissue (Kimwipes®, Kimberly-Clark, Co. Roswell, Ga.) and tested for *Salmonella* as described below. In previous experiments, the internal temperature of non-contaminated shell eggs was monitored during heat treatments with a digital thermometer (Fluke® Model 51II, Fluke, Co., Everett, Wash.) and K-type thermocouples inserted in shell eggs at the distance of the inoculation site.

G. Ozone Treatment

Sets of internally contaminated shell eggs (two eggs per experimental condition in duplicate series) were placed in a modified gasket-sealed stainless-steel vessel (4000 ml, 21.6 cm diam×15.5 cm height; Alloy Products Corp., Waukesha, Wis.) with an adapted 30-psig pressure gauge (Ashcroft®, Dresser Inc., Stratford, Conn.). The sealed vessel was connected with approximately 40 cm of silicone tubing (Masterflex®, Cole-Parmer Instrument Co., Vernon Hills, Ill.), having an internal diameter of 6.4 mm, to a vacuum pump (model 115V; Curtin Matheson Scientific, Inc., Houston, Tex.). In every experiment vacuum (5-10 in Hg vac) was generated and held inside the vessel prior to ozone treatments. Gaseous ozone, generated as previously described, was immediately injected into the vessel under vacuum, until a pressure up to 20 psig was achieved. Gaseous ozone was kept under pressure in the vessel by closing a plug valve (0.6-cm diam tube fitting; Swagelok®, Swagelok Co., Solon Ohio) located between the ozone generator and the treatment vessel. Shell eggs were treated with gaseous ozone under pressure for 20 to 40 minutes according to experimental design. Compressed oxygen (Praxair, Inc., Danbury, Conn.) was used as a control in selected experiments under the conditions described above. After treatments, gaseous ozone under pressure was slowly released from the vessel. Shell eggs were taken from the vessel and gently dry wiped with soft paper tissue (Kimwipes®, Kimberly-Clark, Co. Roswell, Ga.). Sets of four treated shell eggs per experimental condition were tested for enumeration of *Salmonella* as described below.

H. Treatment with Ozone-carbon Dioxide Mixture

Gas mixtures of ozone and carbon dioxide were tested in selected experiments. Internally contaminated eggs were placed in the sealed vessel under vacuum as previously described. Compressed carbon dioxide (Praxair, Inc., Danbury, Conn.) was injected into the vessel at up to 10 psig. The vessel was subsequently pressurized with gaseous ozone to a final pressure of 20 psig. Individual gases passed through a 10-µm pore size stainless-steel sparger (Solvent inlet filter, Upchurch®, Upchurch Scientific, Oak Harbor, Wash.) located at the bottom of the vessel to create turbulence of the gas mixture and to facilitate movement of the gas during the treatment period. Different proportions of ozone-carbon dioxide ($O_3$—$CO_2$) were prepared according to experimental design. Selected gas mixtures included 1:1, 2:1, and 3:1 of $O_3$:$CO_2$ pressure proportions, respectively. Sets of treated and control shell eggs in experiments performed in duplicate were taken from the vessel and analyzed for enumeration of *Salmonella* as described below.

I. Combination of Treatments

Twenty-five combinations with five individual treatment factors were performed according to the central composite design previously described. A typical sequence of combinations consisted of a first step of shell eggs heating followed by a gas treatment with ozone or ozone-carbon dioxide mixture under the conditions described above.

In a first experiment, contaminated shell eggs prepared as described previously were immersed in a water bath at ambient 57±0.2° C. for 20 minutes. Immediately after heat treatment, shell eggs were transferred to the treatment vessel. Vacuum, 5-10 in Hg vac, was applied to the vessel. Subsequently, shell eggs were treated with gaseous ozone under 10±2 psig pressure for 40 minutes (60 minutes total treatment time). Throughout ozonation, the vessel was placed in an orbital shaker (Model 361, Fisher Scientific, Pittsburgh, Pa.) set at 200 rpm. Gaseous ozone under pressure was permitted to vent from the treatment vessel by opening an outlet valve in the container at approximately 5-10 second intervals during ozonation process. In a variation of the first experiment, sets of contaminated shell eggs were heat-treated for 25 minutes, and then were ozonated for 40 minutes (65 minutes total treatment time) under the conditions already described. *Salmonella* Enteritidis was enumerated in treated shell eggs as indicated below.

Typically, the ozone injected into the vessel reacts with the shell eggs and decreases in concentration over the treatment time, especially in a batch system. The addition of venting replenishes the ozone that has already reacted with the shell eggs, and thus maintains a more steady concentration of ozone throughout the decontamination process. Venting facilitates the change from a batch application to a semi-continuous application. Agitation of the treatment vessel facilitates reduction of treatment time and increases microbial lethality. Experimental results indicate an increased inactivation of the microorganism ($\geq 5.5$ and $\geq 6.3$ log) with the use of agitation and venting in a semi-continuous system (Tables 11 and 12).

J. Enumeration of *Salmonella*

Ten eggs were broken and their contents were weighed to determine their average weight; average was 52±2 g. Treated or control eggs were broken aseptically and shells were discarded. Whole egg contents were collected in sterile 18×30 cm polyethylene stomacher bags (Fisherbrand®, Labplas, Inc., Quebec, Canada). Chilled peptone water, 0.1%, 477 ml (Difco Laboratories, Detroit, Mich.) was added to individual egg contents and homogenized in a stomacher (Stomacher lab-blender 400, Cooke Laboratory Products, VA.) for 1 minute. Serial decimal dilutions of the homogenate were immediately prepared in peptone water; aliquots (0.1 to 0.4 ml) were dispensed onto pre-poured plate count agar (PCA; Difco) with subsequent spreading with sterile glass beads. Plates were incubated at 37° C. for 48 hours. Colonies were counted and confirmed as salmonellae by streaking selected colonies onto xylose lysine deoxycholate agar (XLD; Difco). Plates were incubated at 37° C. for 24 hours and the characteristic colony morphology of the microorganism was observed. The typical detection limit of the microorganism by this method was 10 CFU/g egg contents.

K. Statistical Analyses

One hundred and twelve shell eggs (in experiments performed in duplicate with a total of four eggs per experimental condition) were used according to central composite design to develop the response surface model. Experimental design and data analyses were performed in JMP IN® version 4 (SAS Institute Inc., Cary, N.C.). Statistical estimations included paired t-tests ($\alpha = 0.05$), linear regression, multiple and one-way analyses of variance (ANOVA) with 95% confidence limits, and multiple comparisons of means by Tukey ($\alpha = 0.05$).

TABLE 11

Elimination of *Salmonella* Enteritidis in shell eggs by combination of heat (57° C./20 minutes), vacuum, and gaseous ozone treatments with experimental conditions optimized in a response surface model (Treatment 1).

| Treatments[1] | Treatment time minutes | Log CFU/g egg contents[2] | Log reduction |
|---|---|---|---|
| Control | 0 | 6.9 ± 0.1 | n/a[3] |
| $O_3$ | 40 | 6.6 ± 0.3 | 0.3 |
| Heat | 20 | 2.5 ± 0.2 | 4.4 |
| Heat + $O_3$ | 60 | 1.2 ± 0.5 est.[4] | $\geq 5.7$ |

[1]Control: internally-contaminated non-treated shell eggs; $O_3$: gaseous ozone, 12-14% wt/wt, 10 psig; Heat: applied by immersion in a water bath at ambient 57 ± 0.2° C.; Heat + $O_3$: heat for 20 minutes, followed by vacuum (5-10 in Hg vac), and gaseous ozone treatment under pressure (with venting) for 40 minutes. Throughout the $O_3$ treatment, the vessel was placed in an orbital shaker at 200 rpm.
[2]Data presented as Mean ± S.D.
[3]not applicable.
[4]Estimated *Salmonella* Enteritidis number obtained in plate count agar with a detection limit of 10 CFU/g egg contents.

TABLE 12

Elimination of *Salmonella* Enteritidis in shell eggs after treatment with heat (57° C./25 minutes), vacuum, and gaseous ozone with experimental conditions optimized in a response surface model (Treatment 2).

| Treatments[1] | Treatment time (min) | Log CFU/g egg contents[2] | Log reduction |
|---|---|---|---|
| Control | 0 | 6.9 ± 0.1 | n/a[3] |
| $O_3$ | 40 | 6.6 ± 0.3 | 0.3 |
| Heat | 25 | 1.7 ± 0.2 | 4.7 |
| Heat + $O_3$ | 65 | 0.6 ± 0.5 est.[4] | $\geq 6.3$ |

[1]Control: internally contaminated non-treated shell eggs; $O_3$: gaseous ozone, 12-14% wt/wt, 10 psig; Heat: applied by immersion in a water bath at ambient 57 ± 0.2° C.; Heat + $O_3$: heat for 25 minutes followed by vacuum (5-10 in Hg vac), and gaseous ozone treatment under pressure (with venting) for 40 minutes. Throughout the $O_3$ treatment, the treatment vessel was placed in an orbital shaker at 200 rpm.
[2]Data presented as Mean ± S.D.
[3]not applicable
[4]Estimated *Salmonella* Enteritidis number obtained in plate count agar with a detection limit of 10 CFU/g egg contents.

L. Egg Quality Following Treatment

Egg quality of treated shell eggs is shown in Table 13. No apparent change in overall egg quality was observed between treated and untreated control shell eggs. Haugh unit is a measurement of the thickness of egg white. The results (Table 13) do show a slight increase in Haugh units in treated eggs when compared to untreated controls. Yolk index is a measurement of the spherical shape of the yolk and the results indicate no significant ($p > 0.05$) difference between treated shell eggs and untreated controls. Albumen turbidity is a measurement of cloudiness of the egg white and the results showed a slight (p<0.05) increase of the albumen cloudiness in treated shell eggs when compared to untreated controls. Albumen pH in treated shell eggs was slightly (p<0.05) lower than that in untreated controls. Yolk pH was not affected in treated shell eggs when compared to untreated controls. Based on empirical taste testing, there was no difference in the taste of ozone-treated eggs, compared to untreated control eggs.

TABLE 13

Interior egg quality of shell eggs treated by selected combinations of heat and ozone to achieve ≧5 log reduction of *Salmonella Enteritidis* in shell eggs.

| Treatments[1] | Haugh Units[2,3] | Yolk Index[2,3] | Albumen Turbidity[2,3] | pH[2,3] Albumen | Yolk |
|---|---|---|---|---|---|
| Control | 72.5 ± 4.8A | 0.39 ± 0.01A | 0.03 ± 0.01A | 8.99 ± 0.02A | 5.99 ± 0.05A |
| Treatment 1 | 80.8 ± 3.5B | 0.40 ± 0.01A | 0.07 ± 0.01B | 8.87 ± 0.02B | 6.15 ± 0.13A |
| Treatment 2 | 84.0 ± 3.2B | 0.40 ± 0.01A | 0.09 ± 0.01B | 8.85 ± 0.03B | 6.15 ± 0.16A |

[1]Control: shell eggs without treatment; Treatment 1: heat (20 minutes) + gaseous $O_3$ at 10 psig (with venting) for 40 minutes (60 minutes total treatment time); Treatment 2: heat + $O_3$ for 25 and 40 minutes respectively (65 minutes total treatment time) with agitation and venting during gas treatment. During ozonation the treatment vessel was placed in an orbital shaker at 200 rpm.
[2]Data presented as Mean ± S.D.
[3]Means within columns not followed by the same letter differ significantly (p < 0.05)

While the above description contains much specificity, this should not be construed as a limitation on the scope of the invention, but rather as an exemplification of certain preferred or exemplary embodiments. Numerous other variations of the present invention are possible, and it is not intended herein to mention all of the possible equivalent forms or ramifications of this invention. Various changes may be made to the present invention without departing from the scope or spirit of the invention

What is claimed:

1. A process for treating shell eggs to reduce internal *Salmonella Enteritidis* contamination in the eggs, if any, comprising:
    (a) heating the shell eggs at a temperature of about 55 to 60° C. for about 1 to 60 minutes,
    (b) subjecting the eggs to a vacuum of about 5 to 29.9 inches Hg, and thereafter
    (c) maintaining the shell eggs in contact with a treating gas containing about 2-14 wt. % ozone at a pressure above atmospheric pressure for about 1 to 60 minutes.

2. The process of claim 1, wherein the shell eggs are at or below room temperature when subjected to the vacuum.

3. The process of claim 1, wherein steps (c) and (e) are carried out under conditions which are severe enough to reduce *Salmonella Enteritidis* contamination inside the shell eggs, if any, by an amount of at least 0.8 log CFU/g.

4. The process of claim 1, wherein steps (a), (c) and (e) are carried out under conditions which are severe enough to reduce the *Salmonella Enteritidis* contamination inside the shell eggs, if any, from an initial value to a final value, wherein the initial value is about 6.5 to 7.9 log CFU/g, and further wherein the final value is at least about 4.2 log CFU/g less than the initial value.

5. The process of claim 4, wherein the final value is at least about 5 log CFU/g less than the initial value.

6. The process of claim 1, wherein the treatment gas comprises at least about 3.6 vol. % ozone.

7. The process of claim 6, wherein the treatment gas comprises at least about 4.4 vol. % ozone.

8. The process of claim 7, wherein the treatment gas comprises about 12-14 wt. % ozone.

9. A process for treating shell eggs to reduce internal contamination of the shell eggs with *Salmonella Enteritidis*, if any, comprising
    preheating the shell eggs to reduce the *Salmonella Enteritidis* contamination inside the shell eggs, if any, by at least about 1 log CFU/g, preheating being accomplished by heating the shell eggs at a temperature of about 55-60° C. for about 10 to 40 minutes,
    after termination of preheating, subjecting the shell eggs to a vacuum of about 5 to 30 inches Hg, and thereafter
    contacting the shell eggs with a treatment gas containing at least about 2 wt. % ozone for a time sufficient to reduce *Salmonella Enteritidis* contamination inside the shell eggs by an additional amount of at least about 0.8 log CFU/g.

10. The process of claim 9, wherein the shell eggs are at or below room temperature when subjected to the vacuum.

11. The process of claim 9, wherein the pressure of the treatment gas surrounding the shell eggs is raised to above atmospheric pressure, and wherein the shell eggs are maintained in contact with the treatment gas at above atmospheric pressure for about 1 to 60 minutes.

12. The process of claim 11, wherein the shell eggs are preheated and then contacted with an ozone-containing treating gas under conditions severe enough to reduce the concentration of *Salmonella Enteritidis* contamination inside the shell eggs from an initial value to a final value, wherein the initial value is about 6.5 to 7.9 log CFU/g, and further wherein the final value is at least about 4.2 log CFU/g less than the initial value.

13. The process of claim 12, wherein the final value is at least about 5 log CFU/g less than the initial value.

14. The process of claim 11, wherein the treatment gas comprises at least about 3.6 vol. % ozone.

15. The process of claim 14, wherein the treatment gas comprises at least about 4.4 vol. % ozone.

16. The process of claim 15, wherein the treatment gas comprises about 12-14 wt. % ozone.

17. The process of claim 10, wherein the treatment gas comprises about 2-14 wt. % ozone.

18. The process of claim 9, wherein the shell eggs are contacted with the treatment gas for a time sufficient to reduce

*Salmonella Enteritidis* contamination inside the yokes of the shell eggs by an additional amount of at least about 1.4 log CFU/g.

19. The process of claim 9, wherein the shell eggs are preheated and then contacted with an ozone-containing treating gas under conditions severe enough to reduce the concentration of *Salmonella Enteritidis* contamination inside the yokes of the shell eggs from an initial value to a final value, wherein the initial value is about 6.5 to 7.9 log CFU/g, and further wherein the final value is at least about 4.2 log CFU/g less than the initial value.

20. The process of claim 9, wherein the shell eggs are preheated and then contacted with an ozone-containing treating gas under conditions severe enough to reduce the concentration of *Salmonella Enteritidis* contamination in the area surrounding the vitelline membrane outside the yokes of the shell eggs from an initial value to a final value, wherein the initial value is about 6.9 log CFU/g and the final value is at least about 5.7 log CFU/g less than the initial value.

21. A process for treating-shell eggs to reduce internal *Salmonella Enteritidis* contamination in the eggs, if any, comprising:
  (a) subjecting shell eggs previously heated to a temperature of about 55 to 60° C. for about 1to 60 minutes to a vacuum of about 5 to 29.9 inches Hg, and thereafter
  (e) maintaining the shell eggs in contact with a treating gas containing about 2-14 wt. % ozone at a pressure of about 5 to 29.9 inches Hg for a time long enough to reduce the internal *Salmonella Enteritidis* contamination of the shell eggs, if any, from an initial value before heating of about 6.5 to 7.9 log CFU/g to a final value at least about 4.2 log CFU/g less than the initial value.

* * * * *